Patented Apr. 15, 1952

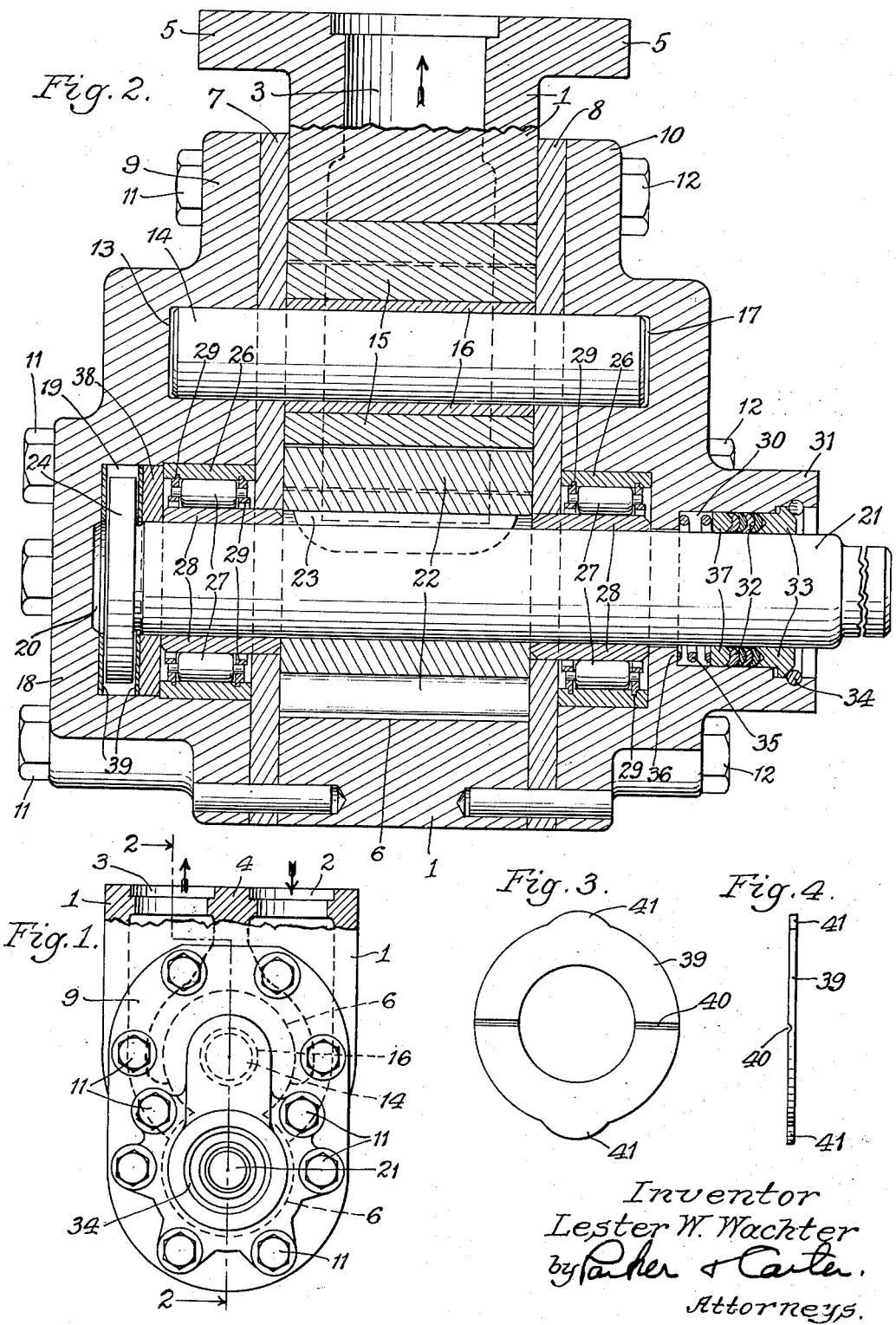

2,593,369

UNITED STATES PATENT OFFICE 2,593,369

PUMP

Lester W. Wachter, Streator, Ill., assignor to Anthony Company, Streator, Ill., a corporation of Illinois Application June 11, 1948, Serial No. 32,505

6 Claims. (Cl. 103—126)

This invention relates to a pump and particularly to a pump of the so-called "gear type," in which two gears mesh to produce the pumping action. It has for one object to provide a mounting for the driven gear which will be economical in construction and reliable in operation.

Another object is to provide a construction in a pump of the type indicated, in which the driven gear "floats" upon the driven shaft and the driven gear is relieved from longitudinal thrust.

Another object is to provide a pump of the type indicated, in which the housing construction is simplified and a minimum number of housing parts is used.

Other objects will appear from time to time throughout the specification and claims.

This invention is illustrated more or less diagrammatically in the accompanying drawings, wherein:

Figure 1 is an end elevation of the pump of the present invention, with parts broken away and parts in section;

Figure 2 is a longitudinal cross section taken on an enlarged scale at line 2—2 of figure;

Figure 3 is a plan view of a thrust washer; and

Figure 4 is a side elevation of the thrust washer of Figure 3.

Like parts are indicated by like characters throughout the specification and the drawings.

1 is a pump housing shaped to provide an inlet passage 2 and an outlet passage 3, which are separated by a partition or dividing member 4. The housing 1 may be provided adjacent the inlet and outlet passages 2 and 3 with a flange 5 for use in attachment to inlet and outlet conduit members or for use in attachment to any desired support.

The inlet passage 2 and the outlet passage 3 communicate with a chamber 6 indicated in dotted lines in Figure 1. This chamber is of generally "Figure 8" shape and contains the gears which comprise the working members of the pump. The chamber 6 is closed at its sides by wearing plates 7 and 8. These wearing plates are held in place, respectively, by housing members 9 and 10. The housing member 9 is secured to the housing member 1 by screws 11 and the housing member 10 is correspondingly held in place on the housing 1 by screws 12.

The housing member 9 is provided with a depression or socket portion 13 to receive the shaft 14 of the gear 15. A bushing 16 may be positioned about the shaft 14, if desired. The housing portion 10 is provided with a depression or socket 17 to receive the opposite end of the shaft 14.

The housing portion 9 is provided with an enlargement 18 which has formed within it a cavity 19 which may be enlarged by the depression 20. Positioned partly within the cavity 19 is the driving shaft 21 upon which is slidably mounted the driving gear 22. This gear meshes with the gear 15 and is secured to the shaft 21 by a key 23 and is free for lateral movement along the shaft 21. One end of the shaft 21 is provided with an integral lateral enlargement 24.

The shaft 21 is preferably supported in antifriction bearings. As shown these bearings are positioned one in the housing section 9 and the other in the housing section 10. The bearings are identical and will be described as one. They comprise outer races 26 which are mounted within suitable cavities in the housing sections which enclose them. A plurality of rollers 27 is positioned between the races 26 and the inner races 28. Cage members 29, 29 may be included and when included they engage the rollers 27. The inner races 28 are placed on the shaft 21. At its outer end the shaft 21 extends through an opening 30 in the enlargement 31 formed as an integral part of the housing section 10.

Packing 32 may be positioned in the opening 30 and about the shaft 21. A packing gland 33 is removably held in place by a spring ring 34. A spring 35 is positioned within the opening 30 and about the shaft 21 and bears at one end against a shoulder 36. At its other end it bears against a packing gland 37 in contact with the packing 32. The spring 35 is biased to exert pressure on the packing and to prevent leakage.

Positioned about the shaft 21 adjacent the enlargement 24 is a thrust member 38. As shown in Figure 2, it is in contact with the outer race 26 of the left-hand antifriction bearing. Positioned on each side of the enlargement 24 is one of a pair of thrust washers 39, 39. These washers as shown in Figures 3 and 4 may be notched, as at 40, and are provided with lateral enlargements or ears 41 which are preferably positioned opposite each other. The notches 40 insure even lubrication over the faces of the thrust washers or rings 39. One face of each ring is, of course, exposed to the interior of the cavity within which the ring lies. The other face bears either against the portion 18 or against the member 38. The notches or grooves 40 make certain the movement of lubricant over the face in which the notches are positioned. The ears or enlargements 41 prevent rotation of the thrust rings 39. They are received in recesses formed in the interior of the cover plate portion 18 and prevent rotation of the rings or washers 39.

In the construction shown, when end thrust develops on the driving shaft 21, the shaft may move longitudinally with respect to the gear 22 which is keyed to it. When this occurs, the gear is not positively moved laterally and hence is not subjected to destructive wear, nor does it affect the housing or the wearing plates 7 or 8. These wearing plates may be of any suitable material but are usually of a bearing material such as bronze, although not limited to this. End thrust of the driving shaft 21 is taken up in either direction by the thrust washers 39. Thrust in an opposite direction is taken up by the member 38, the outer bearing race 26 and the wearing plate 7.

Although I have shown an operative form of my invention, it will be recognized that many changes in the form, shape and arrangement of parts can be made without departing from the spirit of the invention, and my showing is, therefore, to be taken as, in a sense, diagrammatic.

The use and operation of this invention are as follows:

The end thrust on the driving shaft 21 may occur for several reasons. Frequently pumps of the type shown are used in connection with mechanisms such as vehicle tipping assemblies. When the vehicle or vehicle body is tipped the pump moves and the driving shaft for the pump may exert pressure longitudinally. If this pressure were transmitted directly to the driven gear it would, of course, cause the gear to press against the housing and cause wear and damage. To resist this effect, the driving gear may slide freely longitudinally on the shaft. The only resistance to this movement is the friction of the gear under load, and this friction is very slight compared to the full thrust load on the shaft. Hence the gear and shaft slide with respect to each other.

The housing is provided with wearing plates 7 and 8 which may be of bearing material and consequently suitable for use where friction occurs. This alone would not be sufficient to produce a satisfactorily operating pump, and for that reason the enlargement 24 and the parts associated with it are provided. Under certain circumstances of longitudinal thrust the enlargement 24 is thrust either to the right or to the left. If it is forced to the left the enlargement may press against the left washer 39 which is of material suitable for withstanding friction. If the thrust is to the right the enlargement 24 will press against the right-hand washer 39, which in turn bears against the spacing member 38. This latter is sustained by the outer race 26 of the left-hand bearing which bears against the wearing plate 7. Thus longitudinal pressure on the shaft 21 is taken up in either direction by the members described and is not transmitted to the gear or through it to the housing.

I claim:

1. In combination in a pump, a main housing member shaped to receive and surround a pair of meshing pump gears, a driving shaft slidably mounted within one of said gears, an enlargement on said shaft, and means for taking up thrust on said shaft, said means including an imperforate housing closure member for said housing, and parts positioned within said imperforate closure member in engagement with said enlargement, and adapted to absorb longitudinal thrust of said shaft in either direction, a second housing closure member fixed to said main housing member, said shaft extending through said second closure member.

2. In combination in a pump, a main housing member shaped to receive and surround a pair of meshing pump gears, a driving shaft slidably mounted within one of said gears, an enlargement on said shaft at one end thereof, and means for taking up thrust on said shaft, said means including an imperforate housing closure member, and parts positioned within said imperforate closure member in engagement with said enlargement, and adapted to absorb longitudinal thrust of said shaft in either direction, a second housing closure member fixed to said main housing member, said shaft extending through said second closure member, and a pair of friction resistant wearing plates positioned one on each side of said main housing member and positioned to be contacted by said gears.

3. In combination in a pump, a main housing member shaped to receive and surround a pair of meshing pump gears, a driving shaft slidably mounted within one of said gears, an enlargement on said shaft at one end thereof, and means for taking up thrust on said shaft, said means including an imperforate housing closure member, and parts positioned within said imperforate closure member in engagement with said enlargement, and adapted to absorb longitudinal thrust of said shaft in either direction, said parts including thrust washers positioned one on each side of said enlargement, a second housing closure member fixed to said main housing member, said shaft extending through said second closure member, and a pair of friction resistant wearing plates positioned one on each side of said main housing member and positioned to be contacted by said gears.

4. In combination in a pump, a main housing member shaped to receive and surround a pair of meshing pump gears, a driving shaft slidably mounted within one of said gears, an enlargement on said shaft, and means for taking up thrust on said shaft, said means including an imperforate housing closure member, and parts positioned within said imperforate closure member in engagement with said enlargement, and adapted to absorb longitudinal thrust of shaft in either direction, said parts including thrust washers positioned one on each side of said enlargement, said thrust washers having transverse notches to provide a lubricant path, a second closure member fixed to said main housing member, said shaft extending through said second closure member, and a pair of friction resistant wearing plates positioned one on each side of said main housing member and positioned to be contacted by said gears.

5. In combination in a pump, a main housing member shaped to receive and surround a pair of meshing pump gears, a driving shaft slidably mounted within one of said gears, an enlargement on said shaft, and means for taking up thrust on said shaft, said means including an imperforate housing closure member, and parts positioned within said imperforate closure member in engagement with said enlargement, and adapted to absorb longitudinal thrust of said shaft in either direction, said parts including thrust washers positioned one on each side of said enlargement, said thrust washers having enlargements on the periphery thereof and in the same plane as that of said washers, engaging said closure member and adapted to prevent rotation of said washers, a second closure member fixed to said main housing member, said shaft extending through said second closure member, and a pair of friction resistant wearing plates positioned one on each side of said main housing member and positioned to be contacted by said gears.

6. In combination in a pump, a main housing member shaped to receive and surround a pair of meshing pump gears, a driving shaft slidably mounted within one of said gears, an enlargement on said shaft, and means for taking up thrust on said shaft, said means including an imperforate housing closure member, and parts positioned within said imperforate closure member in engagement with said enlargement, and adapted to absorb longitudinal thrust of said shaft in either direction, thrust washers positioned one on each side of said enlargement, said thrust washers having transverse notches providing a lubricant path and also having enlargements on the periphery thereof and in the same plane as that of said washers, engaging said closure member and adapted to prevent rotation thereof, a second closure member fixed to said main housing member, said shaft extending through said second closure member, and a pair of friction resistant wearing plates positioned one on each side of said main housing member and positioned to be contacted by said gears.

LESTER W. WACHTER.

REFERENCES CITED

The following references are of record in the file of this patent:

UNITED STATES PATENTS

| Number | Name | Date |
|---|---|---|
| 1,781,619 | Wendell | Nov. 11, 1930 |
| 1,912,737 | Svenson | June 6, 1933 |
| 1,940,410 | Fitch et al. | Dec. 19, 1933 |
| 2,046,103 | Austin | June 30, 1936 |
| 2,316,565 | Collier | Apr. 13, 1943 |
| 2,344,628 | Monahan | Mar. 21, 1944 |

FOREIGN PATENTS

| Number | Country | Date |
|---|---|---|
| 498,221 | Great Britain | Jan. 4, 1939 |
| 498,839 | Great Britain | Jan. 16, 1939 |